United States Patent
Mahmud

(10) Patent No.: US 11,530,725 B1
(45) Date of Patent: Dec. 20, 2022

(54) POWER TRANSMISSION DEVICE HAVING A FRICTION CLUTCH AND A CONTROLLER CONFIGURED TO DETERMINE AN APPROXIMATED LUBRICANT TEMPERATURE OF THE FRICTION CLUTCH AND RESPONSIVELY CONTROL THE FRICTION CLUTCH

(71) Applicant: AMERICAN AXLE & MANUFACTURING, INC., Detroit, MI (US)

(72) Inventor: Syeda F. Mahmud, Sterling Heights, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/706,929

(22) Filed: Mar. 29, 2022

Related U.S. Application Data

(60) Provisional application No. 63/316,698, filed on Mar. 4, 2022.

(51) Int. Cl.
F16D 48/10 (2006.01)
F16D 13/74 (2006.01)

(52) U.S. Cl.
CPC ............. *F16D 48/10* (2013.01); *F16D 13/74* (2013.01); *F16D 2500/1045* (2013.01); *F16D 2500/30405* (2013.01); *F16D 2500/30406* (2013.01); *F16D 2500/30407* (2013.01); *F16D 2500/30412* (2013.01); *F16D 2500/30415* (2013.01); *F16D 2500/3122* (2013.01); *F16D 2500/5106* (2013.01); *F16D 2500/70408* (2013.01); *F16D 2500/70684* (2013.01)

(58) Field of Classification Search
None
See application file for complete search history.

(56) References Cited

U.S. PATENT DOCUMENTS 6,006,149 A * 12/1999 Salecker ............... F16D 48/066
 701/87
7,445,106 B2 11/2008 Capito
 (Continued)

FOREIGN PATENT DOCUMENTS

DE 102009041412 4/2010
WO WO 2005057039 6/2005
WO WO 2012142277 10/2012

*Primary Examiner* — Timothy Hannon
(74) *Attorney, Agent, or Firm* — Burris Law, PLLC

(57) ABSTRACT

A power transmission device includes a friction clutch, an actuator with an output member, and a controller. The friction clutch is lubricated with a lubricant. The controller is configured to determine a current power state of the friction clutch and determine values for a plurality of thermal coefficients based on the current power state, a set of operation variables, and one or more multi-variable correlation data. The controller is further configured to determine an approximated temperature change of the lubricant based on the values of the plurality of thermal coefficients and a lubricant temperature model. The controller is further configured to determine an approximated lubricant temperature based on the approximated temperature change and a device ambient temperature, and to control operation of the actuator based at least on the approximated lubricant temperature.

20 Claims, 9 Drawing Sheets

(56) References Cited

U.S. PATENT DOCUMENTS

| | | |
|---|---|---|
| 7,743,899 B2 | 6/2010 | Capito |
| 7,747,366 B2 | 6/2010 | Karlsson |
| 8,016,093 B2 | 9/2011 | Capito |
| 8,083,041 B2 | 12/2011 | Capito et al. |
| 8,197,386 B2 | 6/2012 | Capito |
| 8,224,537 B2 | 7/2012 | Olsson et al. |
| 8,311,717 B2 | 11/2012 | Eberhard et al. |
| 8,897,979 B2 | 11/2014 | Hebbale et al. |
| 8,983,746 B1 * | 3/2015 | Song .................. F16D 48/06 |
| | | 701/68 |
| 9,028,358 B2 | 5/2015 | Valente et al. |
| 9,174,573 B1 * | 11/2015 | Pietron ............... F16D 23/12 |
| 10,703,203 B2 | 7/2020 | Legault et al. |
| 2003/0150685 A1 | 8/2003 | Iida et al. |
| 2011/0257838 A1 * | 10/2011 | Olsson ............. F16H 61/688 |
| | | 701/33.4 |
| 2012/0261228 A1 | 10/2012 | Chen et al. |
| 2013/0253784 A1 * | 9/2013 | MacMillian ......... F02D 29/02 |
| | | 701/67 |
| 2016/0041066 A1 * | 2/2016 | Patenaude ......... G01M 13/022 |
| | | 702/130 |
| 2018/0231065 A1 | 8/2018 | Buchanan |
| 2019/0195292 A1 | 6/2019 | Pan et al. |
| 2021/0326496 A1 * | 10/2021 | Lee .................... G06F 30/15 |
| 2021/0348675 A1 | 11/2021 | Zink |

* cited by examiner

POWER TRANSMISSION DEVICE HAVING A FRICTION CLUTCH AND A CONTROLLER CONFIGURED TO DETERMINE AN APPROXIMATED LUBRICANT TEMPERATURE OF THE FRICTION CLUTCH AND RESPONSIVELY CONTROL THE FRICTION CLUTCH

CROSS-REFERENCE TO RELATED APPLICATIONS

This application claims the benefit of U.S. Provisional Patent Application No. 63/316,698 filed Mar. 4, 2022, the disclosure of which is incorporated by reference as if fully set forth in detail herein.

FIELD

The present disclosure generally relates to a power transmission device having a friction clutch and a controller that is configured to determine an approximated temperature of lubricant and responsively control the friction clutch.

BACKGROUND

This section provides background information related to the present disclosure which is not necessarily prior art.

It is fairly common for power transmitting devices, such as power take-off units, transfer cases, differentials, and axle assemblies, to employ a friction clutch for controlling the amount of rotary power that is transmitted between rotary input and output members. Friction clutches employ a clutch pack having two sets of lamella or plates that are interleaved with one another and which are each non-rotatably coupled to an associated one of the rotary input and output members. An actuator is employed to exert a compressive force on the clutch pack to frictionally engage the two sets of plates to one another to thereby resist relative rotation. The amount of torque that is capable of being transmitted through the friction clutch is generally proportional to the magnitude of the compressive force that is exerted by the actuator. In situations where an instantaneous torque differential between the rotary input and rotary output exceeds an instantaneous or present torque transmitting capacity of the friction clutch, one set of the plates will rotate relative to the other set of plates, which can generate significant heat given the magnitude of the friction between adjacent plates. Extreme temperatures in a friction clutch can damage not only the plates, which tend to be formed of relatively thin steel, but could also adversely affect the tribological attributes of the plates. Consequently, it is fairly common to employ pressurized lubrication to lubricate and cool the friction clutch, as well as to monitor the temperature of the lubricant using data from a temperature sensor.

Modern requirements for lower costs, higher efficiency and (reduced) packaging space have tended to further emphasize the need for thermal management of the friction clutch, while simultaneously creating pressure to remove temperature sensors that directly sense the temperature of the lubricant (in an effort to lower the cost of the power transmitting component). While various algorithms have been developed to determine the temperature of lubricant without the use of a dedicated temperature sensor, these algorithms generally appear to be based on excessively simplified assumptions and generalizations and consequently, do not appear to be capable of providing sufficiently accurate estimates of temperature over a complete range of operating conditions.

SUMMARY

This section provides a general summary of the disclosure and is not a comprehensive disclosure of its full scope or all of its features.

A power transmission device includes a friction clutch, an actuator with an output member, and a controller. The friction clutch includes a clutch pack and an apply plate being movable along an axis. The friction clutch is lubricated with a lubricant. The output member is movable along the axis between a first position and a second position. The output member, the apply plate, and the clutch pack are disposed in a force transmission path. The output member is movable along the axis from the first position to the second position to apply relatively more force through the force transmission path onto the clutch pack. The controller is configured to determine a current power state of the friction clutch and determine values for a plurality of thermal coefficients based on the current power state, a set of operation variables, and one or more multi-variable correlation data. The plurality of thermal coefficients is indicative of at least two operation variables in the set of operation variables. The controller is further configured to determine an approximated temperature change of the lubricant based on the values of the plurality of thermal coefficients and a lubricant temperature model. The controller is further configured to determine an approximated lubricant temperature based on the approximated temperature change and a device ambient temperature, and control operation of the actuator based at least on the approximated lubricant temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
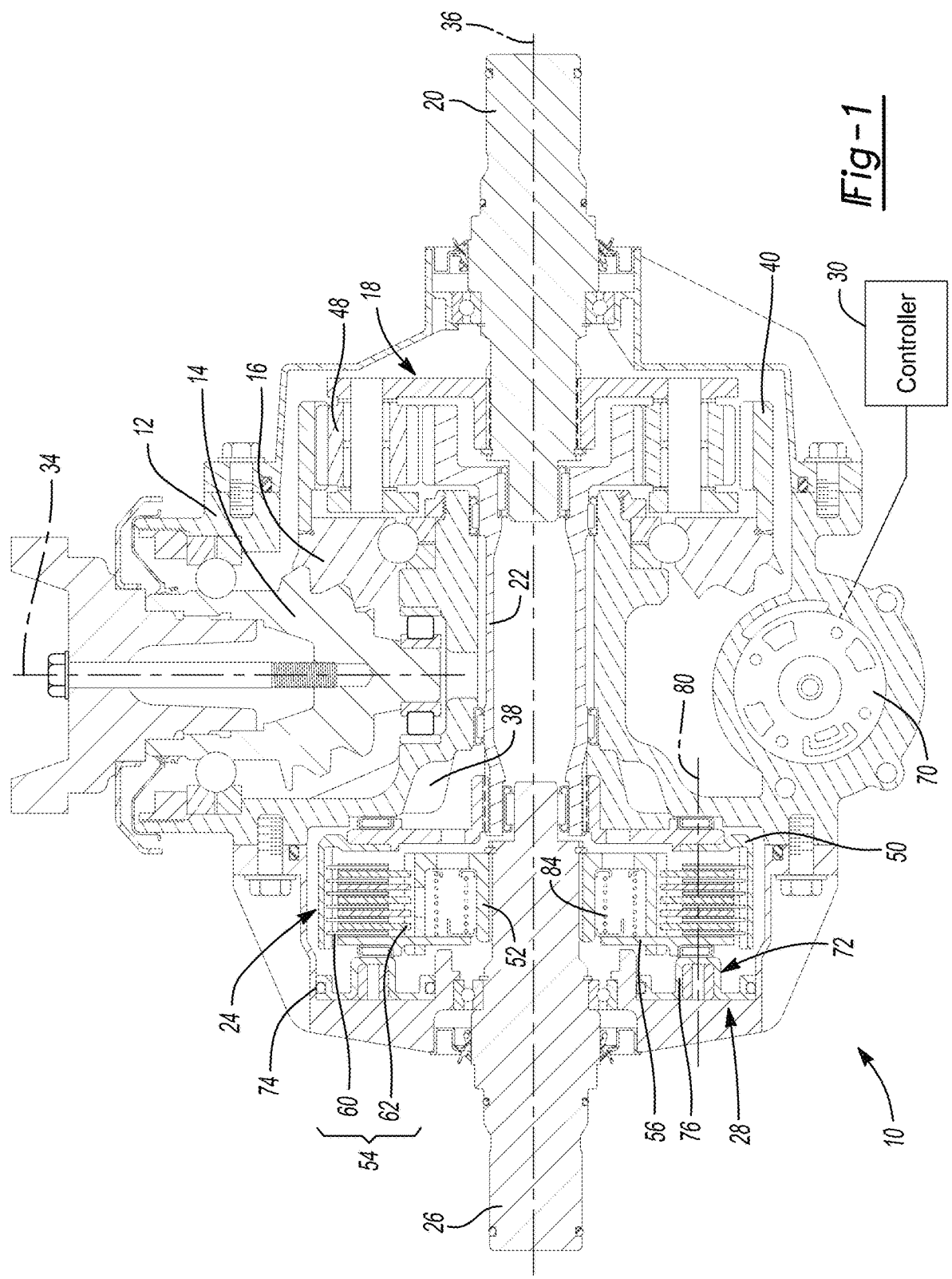
FIG. 1 is a section view of a power transmission device constructed in accordance with the teachings of the present disclosure.

With reference to FIG. 1, an exemplary power transmission device constructed in accordance with the teachings of the present disclosure is generally indicated by reference numeral 10. In the example provided, the power transmission device is an axle assembly, but it will be appreciated that the teachings of the present disclosure have application to various other types of power transmission devices, including power take-off units, differential assemblies, transfer cases, and (rotary) couplings. The power transmission device 10 can include a housing 12, an input pinion 14, a ring gear 16, a differential assembly 18, a first output shaft 20, an intermediate shaft 22, a friction clutch 24, a second output shaft 26, an actuator 28, and a controller 30.

The housing 12 defines a first rotational axis 34, a second rotational axis 36 and an internal cavity 38 into which the input pinion 14, the ring gear 16, the differential assembly 18, the intermediate shaft 22, and the friction clutch 24 are received. The input pinion 14 is rotatable about the first rotational axis 34 relative to the housing 12. The ring gear 16 is meshed with the input pinion 14 and is rotatable about the second rotational axis 36 relative to the housing 12.

The differential assembly 18 includes a differential input member 40, which is coupled to the ring gear 16 for rotation therewith about the second rotational axis 36, and first and second differential output members 42 and 44, respectively, that are rotatable about the second rotational axis 36 relative to the differential input member 40. In the particular example provide, the differential assembly 18 comprises an epicyclic or planetary gear train in which the differential input member 40 is an internal gear, the first differential output member 42 is a planet carrier, the second differential output member 44 is a sun gear, and a plurality of planet gears 48 are journally supported by the planet carrier (i.e., the first differential output member 42) and are meshingly engaged with both the internal gear (i.e., the differential input member 40) and the sun gear (i.e., the second differential output member 44). It will be appreciated, however, that the differential assembly 18 could employ straight bevel or helical gearing in the alternative.

The first output shaft 20 is rotatable about the second rotational axis 36 and is coupled to the first differential output member 42 for rotation therewith. The intermediate shaft 22 is rotatable about the second rotational axis 36 and is coupled to the second differential output member 44 for rotation therewith.

The friction clutch 24 includes a first clutch member 50, a second clutch member 52, a clutch pack 54, and an apply plate 56. In the example provided, the first clutch member 50 is an internally-splined or toothed drum and is coupled to the intermediate shaft 22 for rotation therewith, while the second clutch member 52 is an externally-splined or toothed hub and is coupled to the second output shaft 26 for common rotation about the second rotational axis 36. Accordingly, the first and second clutch members 50 and 52 functions as the input and the output, respectively, of the friction clutch 24. The clutch pack 54 conventionally includes a set of first lamella or clutch plates 60 and a set of second lamella or clutch plates 62. The first clutch plates 60 are non-rotatably but axially slidably coupled to the first clutch member 50, while the second clutch plates 62 are interleaved with the first clutch plates 60 and are non-rotatably but axially slidably coupled to the second clutch member 52. In the example provided, the first clutch plates 60 have external teeth that engage with the internal teeth of the first clutch member 50, while the second clutch plates 62 have internal teeth that engage with the external teeth that are formed on the second clutch member 52. The apply plate 56 can be non-rotatably but axially slidably coupled to one of the first and second clutch members 50 and 52. In the example provided, the apply plate 56 has an internally-splined or toothed aperture (not specifically shown) that is received over the second clutch member 52 and matingly engaged to the external teeth that are formed on the second clutch member 52. In one form, the friction clutch 24 is lubricated with a lubricant.

The actuator 28 can be any type of device or mechanism for moving the apply plate 56 along the second rotational axis 36 to selectively apply or adjust a compressive force that is applied to the clutch pack 54. In the example provided, the actuator 28 includes an electric motor/pump assembly 70 and a hydraulic cylinder assembly 72. The hydraulic cylinder assembly 72 includes an annular cylinder 74, which is formed in the housing 12 concentrically about the second rotational axis 36, and an annular piston 76 that is received in the annular cylinder 74 and which is movable along the second rotational axis 36 between a first position and a second position. It will be appreciated that the annular piston 76 is the "output member" of the actuator 28 in the example provided. The electric motor/pump assembly 70 is configured with a pump (not specifically shown) that provides pressurized hydraulic fluid to the annular cylinder 74 to drive the annular piston 76 (i.e., the output member of the actuator 28) along the second rotational axis 36 from the first position to the second position. It will be appreciated that the annular piston 76, the apply plate 56 and the clutch pack 54 are disposed in a force transmission path 80 and that movement of the annular piston 76 from the first position to the second position correspondingly moves the apply plate 56 along the second rotational axis 36 so that relatively more force is transmitted through the force transmission path 80 to the clutch pack 54. In the example provided, no force is transmitted through the force transmission path 80 when the annular piston 76 is in the first position so that no or relatively little torque can be transmitted through the friction clutch 24. It will be appreciated, however, that the first position could be set or selected so that a force having a magnitude greater than zero is transmitted through the force transmission path 80 so that the friction clutch 24 is always able to transmit a pre-determined minimum torque therethrough. Optionally, the pump of the electric motor/pump assembly 70 is reversible so that it is also able to draw hydraulic fluid from the annular cylinder 74 to permit the annular piston 76 to be moved along the second rotational axis 36 into the first position (e.g., via a plurality of return springs 84).

The controller 30 is configured to determine an approximated temperature of the lubricant and to control the operation of the actuator 28 based at least on the determined temperature of the lubricant. In the example provided, the controller 30 operates the electric motor/pump assembly 70 based at least on the approximated temperature of the lubricant to thereby control the force that is applied by the annular piston 76 (i.e., the output member of the actuator 28)

to the apply plate 56. If desired, the actuator 28 and/or other parts of the power transmission device 10 could include one or more sensors that aid the controller 30 in its operation of the actuator 28. For example, the actuator 28 could include a pressure sensor (not shown) that senses a pressure of the fluid that is output by the electric motor/pump assembly 70 and responsively generates a pressure sensor signal. As another example, the controller 30 can be configured to determine the pressure of the fluid that is output by the electric motor/pump assembly 70 based on a rotational speed of an element of the electric motor/pump assembly 70 (e.g., the motor of the electric motor/pump assembly 70) or based on the power or current that is supplied to the electric motor of the electric motor/pump assembly 70. In yet another example, the power transmission device 10 is configured to include a temperature sensor to detect a device ambient temperature of the power transmission device, which is provided to the controller 30 for determining the approximated temperature of the lubricant, as described herein. The approximated temperature of the lubricant may also be referred to as an "approximated lubricant temperature" and the device ambient temperature may also be referred to as "ambient temperature."

The controller 30 is configured to communicate with other vehicle controller(s) and/or sensors disposed in a vehicle system having the power transmission device 10 by way of a vehicle communication network (not shown). For example, the controller 30 is configured to receive a torque command from the other vehicle controller. In one form, the torque command may indicate a requested amount of torque to be applied to the friction clutch 24 or may include data employed by the controller 30 to determine the requested amount of torque. In another example, the controller 30 is configured to receive data indicative of a drive mode from the other vehicle controller of the vehicle system. In another example, the controller 30 may receive data related to speed of one or more wheels of the vehicle system from sensors disposed at the wheel(s). While specific examples are provided, the controller 30 may receive other data via the vehicle communication network. In a non-limiting example, the other vehicle controller may include an engine controller, a transmission controller, and/or a driveline controller.

To determine the approximated lubricant temperature, the controller 30 is configured to employ a set of time-based regression models that considers multiple factors or operation variables that influence the temperature of the lubricant. More particularly, table 1 below provides non-limiting examples of operation variables that may be used for determining the approximated lubricant temperature.

TABLE 1

Example Operation Variables

| Operation Variables | Abbreviation | Example Source |
|---|---|---|
| Torque | Trq | Amount of torque to be applied amount and can be based on a torque command |
| Wheel Speed(s) (e.g., front right wheel (frw), front left wheel (flw), rear right wheel (RRW), rear left wheel (RLW)) | S_frw, S_flw, S_rrw, S_rlw | Wheels speeds received from vehicle network (e.g., sensor/engine controller) (collectively "wheel speeds (S_WS)") |
| Power | Pwr | Power input determined by torque and clutch slip speed (i.e., a power state) |
| Drive Mode | D_Mode | Drive mode of vehicle system (e.g., two-wheel drive (2WD), four-wheel drive (4WD), among others) received from, for example, the engine controller via vehicle network |
| Ring Gear Speed (i.e., Differential Input Speed) | S_RG | Ring gear speed determined based on one or more wheel speeds (e.g., S_frw and S_flw) |
| Clutch Inner Basket Speed | S_CIB | Clutch inner basket speed determined based on ring gear speed and wheel speed (e.g., S_rlw) |
| Clutch Slip Speed | S_CS | Clutch slip speed is the rotational speed difference between the first and second clutch members 50 and 52 and is determined based on clutch inner basket speed, wheel speed (e.g., S_rrw), and drive mode |
| Device Ambient Temperature (i.e., Ambient Temperature) | T_Amb | Ambient temperature provided by a temperature sensor at the power transmission device 10 |
| Approximated Lubricant Temperature At Engine Shut Off | T_ESO | Last approximated lubricant temperature determined when engine is turned off or, in other words, shut off (i.e., previous ignition approximated lubricant temperature) |
| Initial Lubricant Temperature | T_InitLub | Initial lubricant temperature determined at engine start based on engine off time and approximated lubricant temperature when the engine was shut off |

Figure 2:
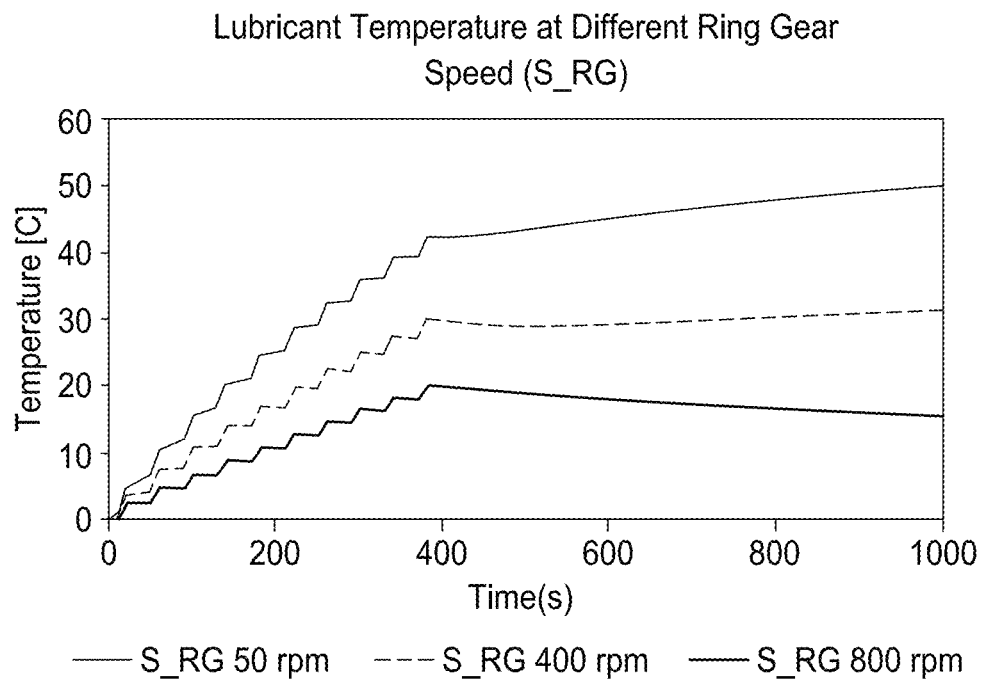
FIG. 2 is a graph providing the relationship of lubricant temperature over time at different ring gear speeds during engagement and disengagement of a friction clutch.

In some applications, the operation variables may have a non-linear correlation with the temperature of the lubricant (i.e., lubricant temperature), which can increase the complexity of estimating the lubricant temperature. For example, FIG. 2 illustrates the influence that the ring gear speed has on lubricant temperature during engagement and disengagement of the friction clutch 24 with the torque and clutch slip speed being held constant. As illustrated, between 0 to about 400 seconds, a friction clutch routinely undergoes engagement, which is indicated by steep rise in temperature, and disengagement, which is indicated by slight leveling of lubricant temperature. After 400 seconds, the friction clutch is disengaged and the lubricant temperature begins to cool when the ring gear speed is approximately 50 RPM, but begins to increase with higher ring gear speeds, such as 400 RPM and 800 RPM.

Figure 3:
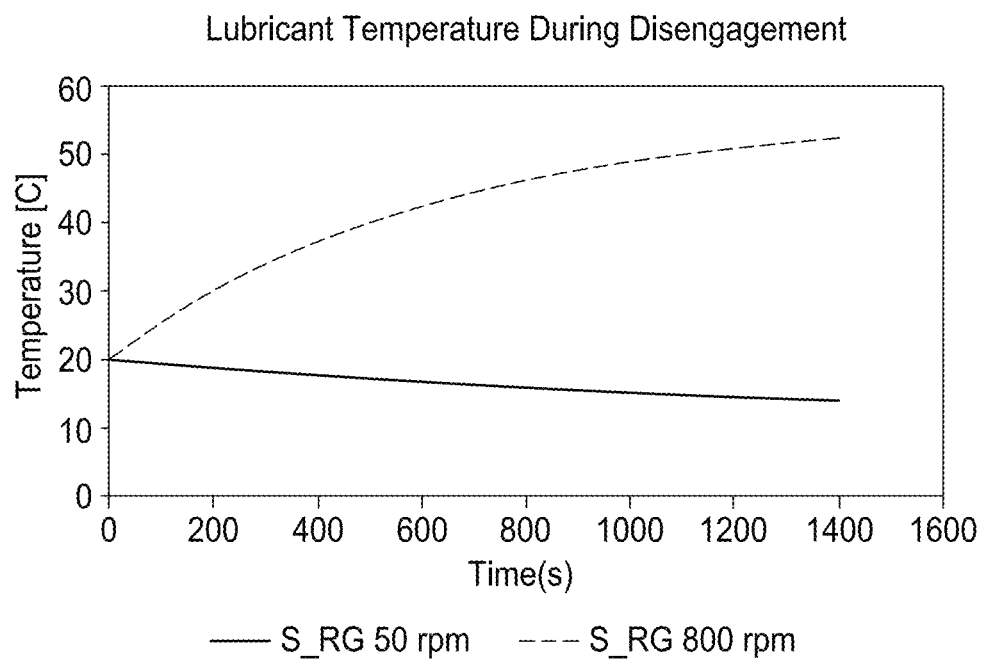
FIG. 3 is a graph providing the relationship of lubricant temperature over time at different ring gear speeds during disengagement of the friction clutch.

More particularly, in another example, FIG. 3 illustrates the effect the ring gear speed has on the lubricant temperature when the lubricant temperature is initially at about 20° C. With the friction clutch 24 being disengaged, the lubricant temperature decreases when the ring gear speed (i.e., S_RG) is 50 RPM, but the lubricant temperature increases when the ring gear speed (i.e., S_RG) is 800 RPM. As illustrated, the frictional loss due from the ring gear rotation increases the temperature of the lubricant in the disengaged state, and thus, the lubricant temperature at disengagement may not be decreasing.

While the differential 18 includes a hypoid ring gear, a differential assembly could be configured to include other types of gears such as, an annular helical gear. Accordingly, the term "ring gear speed" is not intended to limit the application of the present disclosure to a hypoid ring gear and may more generally be referred to as a differential input speed.

It should be readily understood that FIGS. 2 and 3 are provided for explanation purposes only and are not intended to limit the scope of the present disclosure. The values provided in FIGS. 2 and 3 are just examples and are not intended to be representative of ideal or even nominal response of the lubricant temperature.

In another example, the device ambient temperature may also influence the temperature of the lubricant. For example, a flow or coating properties of lubricant may be different at different ambient temperatures. Specifically, the viscosity of the lubricant may be less at higher ambient temperature than lower ambient temperatures, which changes the heating and cooling properties of the lubricant.

In yet another example, the rate at which the lubricant cools over time may also be dependent on the drive mode of the vehicle. Specifically, with the vehicle being in 2WD, the plates of the friction clutch 24 are fully open permitting lubricant to flow through gaps between the plates. In four-wheel drive (4WD) and with the friction clutch 24 being disengaged, the plates of the friction clutch 24 may be in contact with each other reducing or inhibiting the lubricant from flowing between the plates and thus, the cooling rate of the lubricant may be lower in 4WD than in 2WD.

It should be readily understood that the lubricant temperature may be influenced by other operation variables, such as torque and clutch slip speed, and should not limited to ring gear speed, device ambient temperature, and drive mode.

As used herein, a "determination" of the approximated lubricant temperature represents the continuous or time-based determination of the approximate lubricant temperature as long as the engine is ON. In one form, the rate at which the determination is made is based on a processor clock employed by the controller 30, the rate at which other devices provide data, among other factors. In another form, the rate at which the determination can be based on a user defined cycle time.

Figure 4:
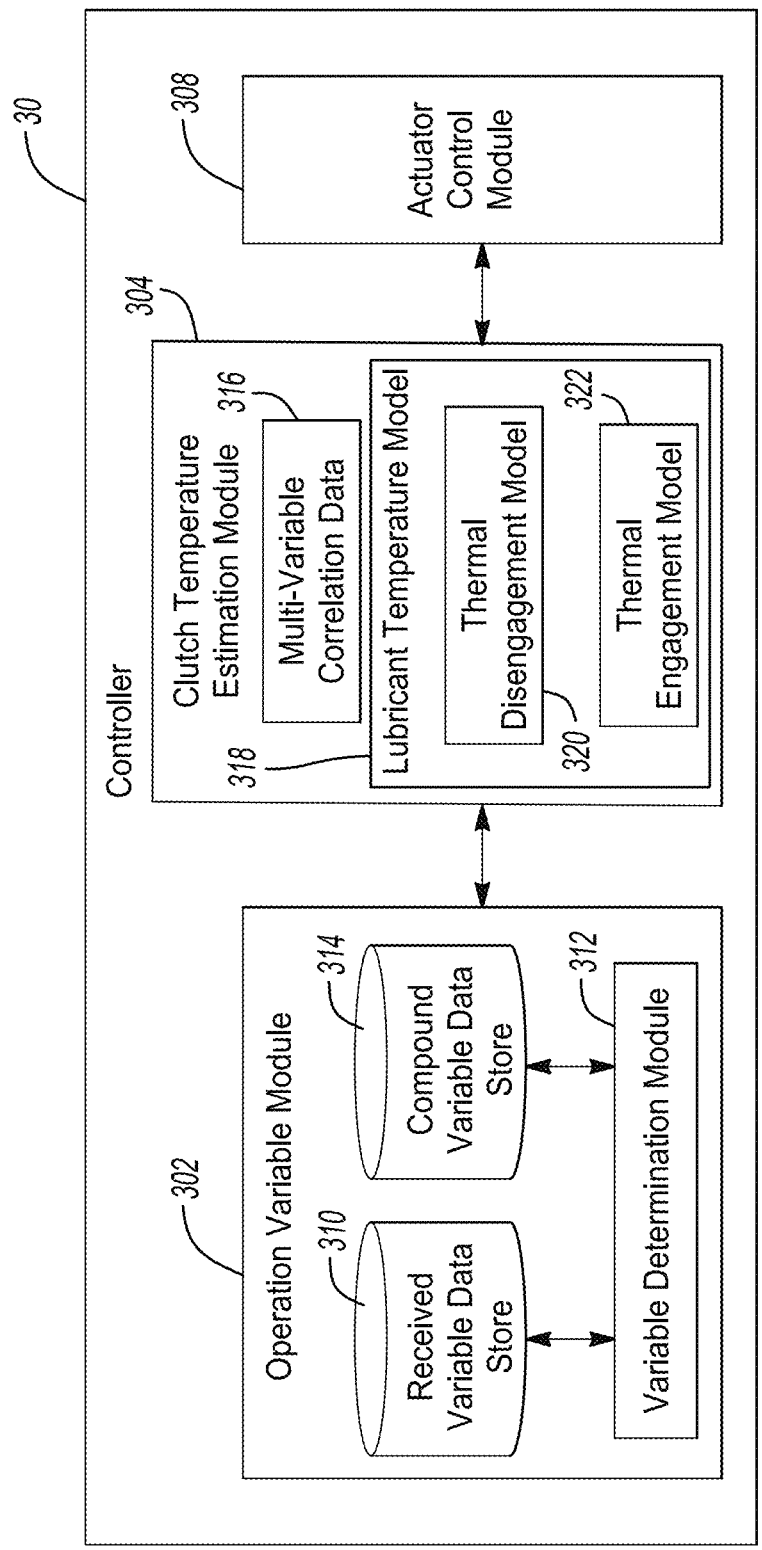
FIG. 4 is an example block diagram of a controller in accordance with the teachings of the present disclosure.

Referring to FIG. 4, an example block diagram of the controller 30 is provided. The controller 30 includes an operation variable module 302, a lubricant temperature estimation module 304, and an actuator control module 308. The operation variable module 302 is configured to obtain the operation variables for determining the approximated lubricant temperature. Based on the type of operation variable, the operation variable module 302 may determine the operation variable using predefined information and/or receive the operation variable from other devices (e.g., a sensor and/or other controller).

More particularly, in one form, the operation variable module 302 includes a received variable data store 310, a variable determination module 312, and a compound variable data store 314. The received variable data store 310 is configured to obtain operation variables received from the other devices, such as but not limited to, torque, drive mode (e.g., data that indicates the drive mode of the vehicle, which may include 2WD, 4WD, or other drive modes), wheel speed(s), and/or device ambient temperature, among other operation variables.

The variable determination module 312 is configured to determine various operation variables using stored information such as, but not limited to, formulas, models, and/or correlation data (e.g., correlation data may be provided in the of a look-up table). For example, the variable determination module 312 is configured to determine: power as a function of torque and clutch slip speed; ring gear speed as a function of wheel speeds of the front right wheel and the front left wheel; clutch inner basket speed as a function of the ring gear speed and the wheel speed of the rear left wheel; and clutch slip speed as a function of clutch inner basket speed, wheel speed of right rear wheel, and drive mode. The variable determination module 312 may also be configured to determine other operation variables, such as an initial lubricant temperature, a desired power state change, which is determined based on a current power state (i.e., a current power input) and a previous power state (i.e., a power input from the previous determination), and should not be limited to the examples provided herein.

The compound variable data store 314 is configured to obtain selected operation variables that influence subsequent determinations of the approximated lubricant temperature. For example, the power employed for a first determination of the approximated lubricant temperature is used in a subsequent determination of the approximated lubricant temperature to determine a desired power state change, which indicates if the power increased or decreased from the previous determination. Accordingly, the compound variable data store 314 obtains the power determined from a current determination of the approximated lubricant temperature and provides the power for the subsequent determination. It should be readily understood that the compound variable data store 314 is configured to obtain and provide different types of operation variables to be employed for subsequent determinations and should not be limited to the examples provided herein. In a non-limiting example, the received variable data store 310 and the compound variable data store 314 may be provided as registers within a processor and/or a separate memory circuit.

The lubricant temperature estimation module 304 is configured to determine the approximated lubricant temperature employing multi-variable correlation data 316 and one or more thermal regression models including a lubricant temperature model 318. More particularly, the lubricant temperature estimation module 304 is configured to determine an initial lubricant temperature at an ignition cycle (i.e., when engine is turned ON) and adjust the initial lubricant temperature based on an approximated temperature change determined using the multi-variable correlation data 316 and the lubricant temperature model 318. Using a set of operation variables, the multi-variable correlation data 316 is configured to determine values for a plurality of thermal coefficients that are provided to the lubricant temperature model 318 to determine the approximated temperature change of the lubricant.

More particularly, in one form, the lubricant temperature model 318 is provided as one or more time counter based non-linear regression equations having multiple thermal coefficients. The values of the thermal coefficients of the regression equations are determined using multi-variable correlation data 316 that, for a selected thermal coefficient, correlates values of the selected thermal coefficients to one or more selected operation variables. Specifically, the multi-variable correlation data 316 is defined using data sets representative of the effect one or more operation variable has on the lubricant temperature. For example, data sets similar to those provided in FIGS. 2 and 3, in which the lubricant temperature is provided over time for varying values of a selected operation variable, are used to define correlation data for the selected thermal coefficient. In a non-limiting example, the data set may be obtained through controlled experiments/tests and/or computational fluid dynamic thermal models designed to simulate relationship between various operation variables and the lubricant temperature. In addition, the correlation data can be defined using statistical tools. In some applications, the correlation data is provided as multi-factor look-up table that associates the selected thermal coefficient to multiple selected operation variables. For example, while the ring gear speed is an operation variable, the ring gear speed is a function of selected wheel speeds, which are also operation variables.

The lubricant temperature model 318 is defined based on the operation variables captured in the multi-variable correlation data (e.g., 2 or more operation variables. Specifically, using known statistical tool that employ regression modeling methodologies, the data sets relating various operation variables to lubricant temperature can be analyzed to define the lubricant temperature model 318 that outputs the approximated temperature change.

In one form, the lubricant temperature model 318 may include a thermal engagement model and a thermal disengagement model to characterize the heating and/or cooling characteristics of the lubricant when the friction clutch 24 is engaged and disengaged, respectively. Generally, the lubricant temperature increases at a faster rate during engagement than at disengagement. As noted above, certain operation variables, such as the ring gear speed, can provide different cooling and heating characteristics even when the friction clutch 24 is disengaged.

Accordingly, the multi-variable correlation data 316 includes an engagement correlation data (i.e., may also be referred to as a first set of multi-variable correlation data) and a disengagement correlation data (i.e., a second set of multi-variable correlation data). The engagement correlation data provides values of a first set of thermal coefficients based on values of a first group of operation variables. The disengagement correlation data provides values for determining a second set of thermal coefficients based on values of second group of operation variables. The first group of operation variables includes at least one operation variable that is different from that of the second group of operation variables. In a non-limiting example, the first group of operation variables may include the current power input (i.e., a current power state), ring gear speed, device ambient temperature, and a previous approximated temperature change provided in a previous determination. In a non-limiting example, the second group of operation variables may include ring gear speed, device ambient temperature, previous approximated temperature change, and desired power state change, which is a difference between the current power input and a previous power input.

In one form, the thermal engagement model of the lubricant temperature model 318 is configured to determine an approximated temperature change of the lubricant during engagement based on the values of the first set of thermal coefficients. During disengagement, the thermal disengagement model of the lubricant temperature model 318 is configured to determine the approximated temperature change of the lubricant based on the values of the second set of thermal coefficients.

In one form, given the varying cooling and heating characteristics of the lubricant during disengagement, the thermal disengagement model of the lubricant temperature model 318 further includes a lubricant cooling-rate portion and a friction-based thermal portion. The lubricant cooling-rate portion is configured to determine a first disengagement temperature change associated with convective thermal characteristics of disengagement of the friction clutch 24, and the friction-based thermal portion is configured to determine a second disengagement temperature change associated with friction-based thermal characteristics of disengagement of the friction clutch 24. More particularly, in one form, the convective thermal characteristic of the lubricant is characterized by operation variables that decrease the temperature of the lubricant via convection principles. Operation variables that can decrease the temperature of the lubricant can be identified via data sets as described above, and in an example application, include the second group of operation variables, (e.g., a ring gear speed, the device ambient temperature, and an approximated temperature change in the previous determination). Accordingly, the disengagement correlation data includes correlation data for determining values of a set of cooling-rate thermal coefficients employed by the lubricant cooling-rate portion of the thermal disengagement model of the lubricant temperature model 318 to determine the first disengagement temperature change. Similarly, the friction-based thermal characteristics is characterized by operation variables that can increase the temperature of the lubricant during disengagement. Such operation variables that can increase the temperature of the lubricant can include, but are not limited to, ring gear speed and device ambient temperature, which are part of the second group of operation variables. Accordingly, the disengagement correlation data includes correlation data for determining values of a set of friction thermal coefficients employed by the lubricant friction based thermal portion of the thermal disengagement model of the lubricant temperature model 318 to determine the second disengagement temperature change. The thermal disengagement model is configured to determine the approximated temperature change based on a summation of the first disengagement temperature change and the second disengagement temperature change.

Accordingly, the lubricant temperature model 318 is configured to capture a net effect on the lubricant temperature due to different forms of heating and cooling factors during engagement and disengagement. That is, heating and cooling rates of the lubricant are determined from a set of time counter based non-linear regression equations and the thermal coefficients of the regression equations are functions selected operation variables that affect lubricant temperature, such as, but not limited to, torque, clutch slip speed, ring gear speed, ambient temperature, and drive mode. By considering the various heating and cooling factors during both engagement and disengagement, the lubricant temperature model 318, can improve the accuracy of the approximated lubricant temperature.

In one form, the lubricant temperature estimation module 304 is configured to determine the initial lubricant temperature at the start of the ignition cycle (i.e., when engine is turned on) based on the approximated lubricant temperature when engine was turned off (i.e., T_ESO), an engine off time (i.e., time period or duration that the engine has been off), and the ambient temperature of the power transmission device 10. To improve accuracy of the initial lubricant temperature, the lubricant temperature estimation module 304 is configured to include a temperature initialization model that is a function of the last approximated lubricant temperature determined when the engine was turned off (i.e., a previous ignition) and the engine off time. Specifically, after the engine is turned off, the lubricant temperature begins to decrease and the longer the engine is off, the cooler the lubricant becomes. Accordingly, the initial lubricant temperature at an engine shut off time of one hour is different from that of five hours. Accordingly, the initial lubricant temperature may also be an operation variable. The temperature initialization model can be defined using a data set that provides the effect the approximated lubricant temperature at engine shut off and the engine off time has on the lubricant temperature. Like the lubricant temperature model 318, the temperature initialization model can be defined using known statistical tools employing regression modeling methodologies. In lieu of a temperature initialization model, the lubricant temperature estimation module 304 may employ correlation data (e.g., a type of look-up table) that associates the approximated lubricant temperature at engine shut off, the engine off time, and the ambient temperature to an initial lubricant temperature.

In one form, the lubricant temperature estimation module 304 is also configured to determine a pre-engagement temperature change (i.e., $\Delta T\_PreEng$), as an approximated temperature change. The pre-engagement temperature change is the amount the initial lubricant temperature has changed since the engine was turned ON and the friction clutch 24 has not been engaged. That is, selected operation variables (i.e., pre-engagement operation variables) may influence the lubricant temperature prior to an engagement of the friction clutch 24. The pre-engagement temperature change is determined based on the pre-engagement operation variables and a pre-engagement temperature model. In one form, the pre-engagement operation variables include the ring gear speed, the clutch slip speed, the drive mode, and the ambient temperature. In an example application and similar to the lubricant temperature model 318, the pre-engagement temperature model includes a time counter based non-linear regression equation that is determined using a data set that provides the effect the ring gear speed, the clutch slip speed, the drive mode, and the ambient temperature have on the lubricant temperature over time prior to any engagement of the friction clutch 24. Once the friction clutch 24 is engaged, the lubricant temperature estimation module 304 determines the approximated temperature change via the lubricant temperature model 318. In another example, the lubricant temperature estimation module 304 employs correlation data such as a look-up table to determine the pre-engagement temperature model.

In one form, the lubricant temperature estimation module 304 employs one or more process registers as counters to track the duration of pre-engagement state, engagement state, and/or disengagement state.

In one form, the lubricant temperature estimation module 304 is configured to determine the approximated lubricant temperature as a summation of the approximated temperature change and the ambient temperature (i.e., a contemporaneous value of a device ambient temperature). The approximated lubricant temperature change in one determination is provided for a subsequent determination of the approximated temperature change and may be referred to as a cumulative temperature change ($\Delta T\_Cum$). Accordingly, the approximated lubricant temperature determined may be a function of a previous approximated lubricant temperature change determination.

The actuator control module 308 is configured to control operation of the actuator based at least on the approximated lubricant temperature. In an example application, the actuator control module 308 is configured to execute a restricted control mode to reduce the lubricant temperature or more particularly, inhibit the lubricant from heating beyond a set temperature threshold. Specifically, the actuator control module 308 compares the approximated lubricant temperature to a first temperature threshold to determine if the approximated lubricant temperature is greater than the first temperature threshold. If the approximated lubricant temperature is greater than the first temperature threshold, the actuator control module 308 enters the restricted control mode in which the actuator control module 308 controls the actuator to provide a reduced torque output. In one form, the actuator control module 308 may provide a signal to the vehicle controller indicating that the friction clutch 24 is in the restricted control mode. The first temperature threshold is provided as a value less than a maximum permitted lubricant temperature, and thus, the actuator control module 308 begins to control the actuator to address the high approximated lubricant temperature prior to the lubricant temperature reaching the maximum permitted lubricant temperature. In one form, the reduced torque output is less than a maximum torque output of the actuator (e.g., reduced torque output <50% of maximum torque output).

In the restricted control mode, the actuator control module 308 is configured to determine whether the approximated lubricant temperature is greater than a second temperature threshold that is greater than the first temperature threshold. That is, even with the reduced torque output, the approximated lubricant temperature may continue to increase. In one form, the second temperature threshold is greater than the first temperature threshold and less than or equal to the maximum permitted lubricant temperature.

If the approximated lubricant temperature is greater than the second temperature, the actuator control module 308 is configured to further control the operation of the friction clutch 24 to manage the lubricant temperature. For example, the actuator control module 308 may be configured to provide a zero-torque output in which the actuator control module 308 does not operate the actuator 28 to apply the compressive force to the clutch pack 54 of the friction clutch 24.

The actuator control module 308 operates the actuator 28 under the restricted control mode until the approximated lubricant temperature decreases to a value less than or equal to a third temperature threshold that is less than the first threshold. Accordingly, once the approximated lubricant temperature is below or at the third temperature threshold, the actuator control module 308 is configured to exit the restricted control mode and return to a standard clutch operation. For example, in the standard clutch operation, the actuator control module 308 is configured to operate the actuator 28 to provide the requisite torque based on the torque command.

The controller 30 can be configured in various suitable ways to perform the functions described above. For example, referring to FIG. 5, an example lubricant temperature determination routine 400 performed by the controller 30 is provided. In one form, the routine 400 is performed when the engine is turned ON (i.e., an ignition cycle) and the controller 30 (FIG. 4) is turned ON. At 402, the controller 30 obtains an engine off time (EOT) (i.e., time period or duration that the engine has been off) and current values of various operation variables such as, but not limited to: the approximated lubricant temperature at engine shut off (T_ESO) of previous cycle, wheel speeds, ambient temperature, and/or drive mode. At 404, the controller 30 determines an initial lubricant temperature (T_InitLubri) based on the engine off time (EOT) and the approximated lubricant temperature at engine shut off (T_ESO). At 406, the controller 30 determines a pre-engagement approximated lubricant temperature change ($\Delta T\_PreEng$) based on pre-engagement temperature model and one or more operation variables including the initial lubricant temperature (T_InitLubri). As provided above, when the engine is turned on the friction clutch 24 may not be immediately engaged but the lubricant temperature may change due to changing operation variables. The operation variables for determining the pre-engagement approximated lubricant temperature change (ΔT_PreEng) may also include the clutch slip speed, the ring gear speed, the drive mode, and/or the ambient temperature. At 408, the controller 30 determines the approximated lubricant temperature (T_AprLubri) based on the ambient temperature (T_Amb) and the pre-engagement approximated lubricant temperature change (ΔT_PreEng). For example, the approximated lubricant temperature (T_AprLubri) is provided as a summation of the ambient temperature (T_Amb) and the pre-engagement approximated lubricant temperature change (ΔT_PreEng). At 408, the controller 30 also stores the approximated lubricant temperature (T_AprLubri) in a designated non-volatile memory.

At 410, the controller 30 determines if a torque command (Trq_Cmd) is received. That is, the controller 30 determines if the first torque command (Trq_Cmd) to engage the friction clutch 24 is received. If the first torque command is not received, the controller 30 proceeds to 412 to obtain current values of the operation variables and then proceeds back to 406 to determine the pre-engagement approximated lubricant temperature change (ΔT_PreEng). In one variation, during a second determination of the approximated lubricant temperature change and when the friction clutch 24 has not been engaged since the engine was turned ON, the controller 30 may determine the pre-engagement approximated lubricant temperature change (ΔT_PreEng) based on previously determined pre-engagement approximated lubricant temperature change (ΔT_PreEng) in lieu of the initial lubricant temperature.

If the torque command is received, the controller proceeds to 414 to obtain the operation variables and determine the current power input (Pwr) based on the torque (Trq) of the torque command (Trq_Cmd) and the clutch slip speed (S_CS) (i.e., the rotational speed difference between the first and second clutch members 50 and 52 (FIG. 1)).

At 416, the controller 30 determines values of one or more thermal coefficients based on the multi-variable correlation data 316 and a set of operation variables. At 418, the controller 30 determines an approximated lubricant temperature change (ΔT_Lubri), which approximates a change in the approximated lubricant temperature (T_AprLubri) from its previous value, based on the thermal coefficients and the lubricant temperature model 318. At 420, the controller 30 determines an approximated lubricant temperature (T_AprLubri) based on the ambient temperature (T_Amb) and the approximated lubricant temperature change (ΔT_Clutch) and mores specifically, as a summation of the ambient temperature (T_Amb) and the approximated lubricant temperature change (ΔT_Clutch).

At 422, the controller 30 stores the current value of the approximated lubricant temperature (T_AprLubri) in the designated non-volatile memory. In one form, the controller proceeds to 424 determine if the engine is turned off and if the engine is turned off, the routine 400 ends. Accordingly, when the engine is turned OFF, the controller 30 is turned OFF. The value of the approximated lubricant temperature (T_AprLubri) stored by the controller 30 at 422 may be employed as the last approximated lubricant temperature at the time the engine was turned off (T_ESO) when the engine is subsequently turned ON (i.e., new ignition cycle). In the event the engine is not turned OFF, the controller 30 returns to 414 to obtain values of the operation variables and determine the approximated lubricant temperature (T_AprLubri).

Figure 6A:
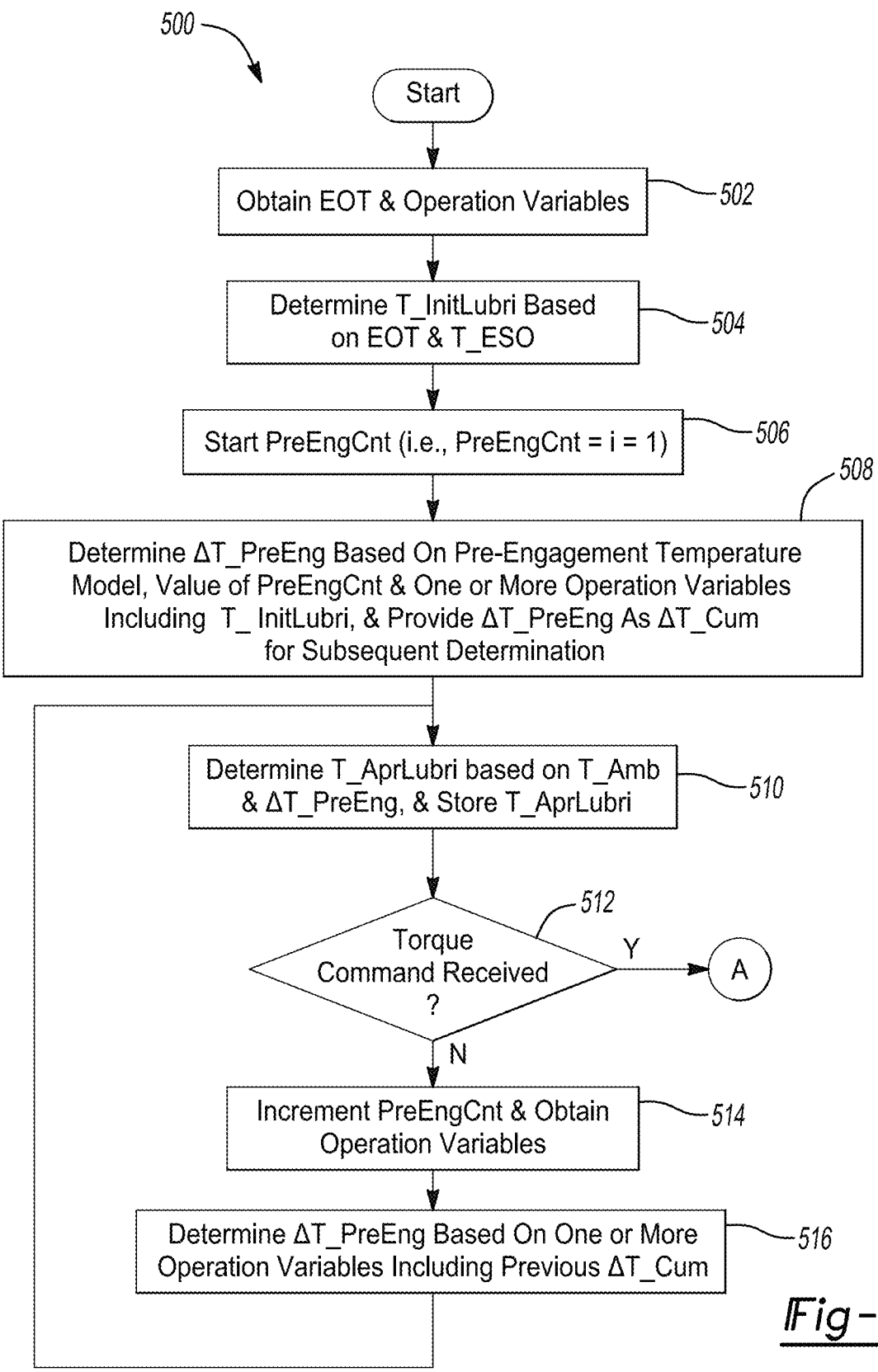
FIGS. 6A and 6B are flowcharts of another example lubricant temperature determination routine in accordance with the teachings of the present disclosure.
Figure 6B:
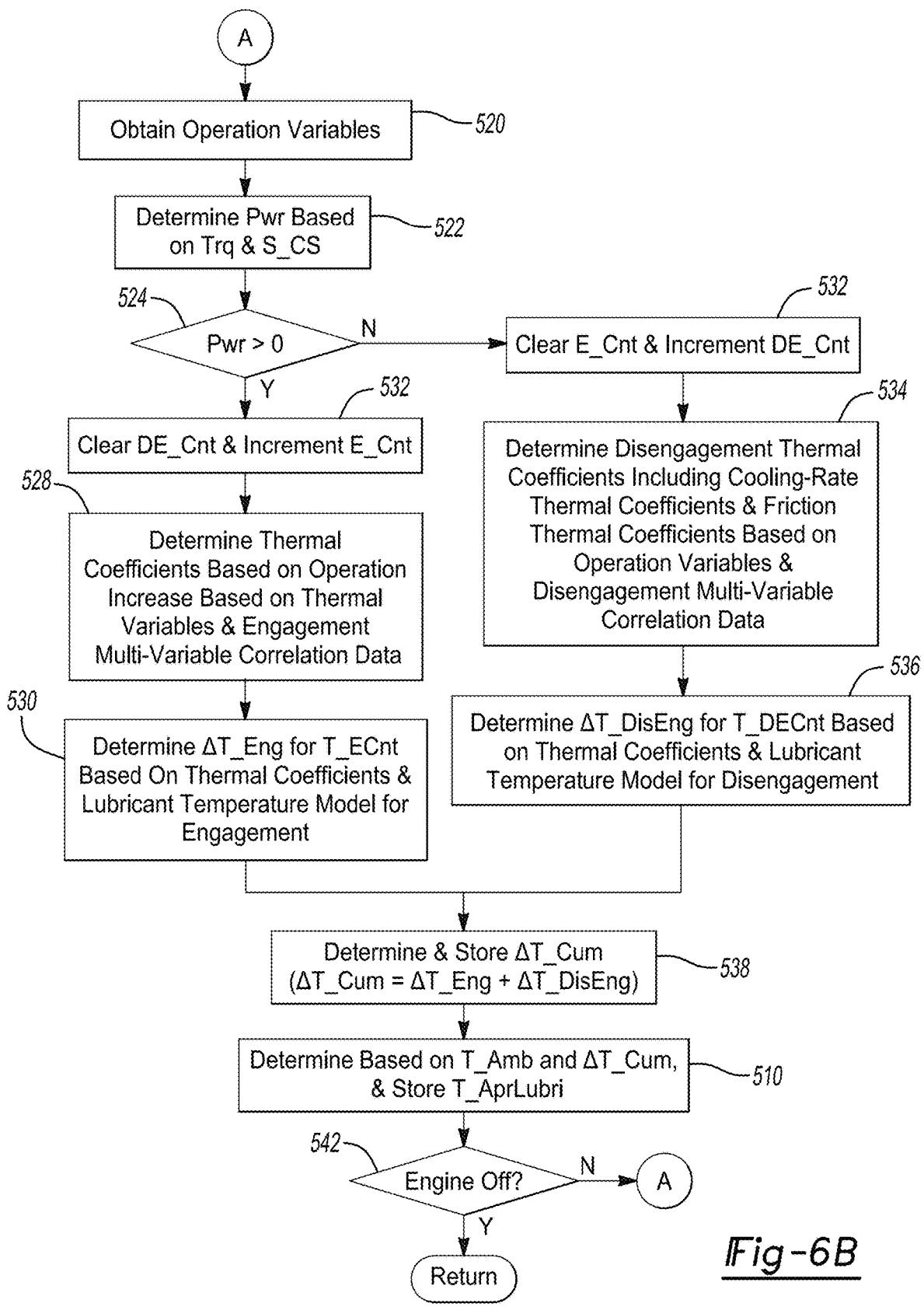

Referring to FIGS. 6A to 6B, another lubricant temperature determination routine is provided (i.e., lubricant temperature determination routine 500). Like routine 400, the routine 500 is performed when the engine is turned ON (i.e., an ignition cycle) and the controller 30 is turned ON. At 502, the controller 30 obtains the engine off time (EOT) and current values for various operation variables such as, but not limited to: a value of the approximated lubricant temperature at engine shut off (T_ESO), wheel speeds, ambient temperature, and/or drive mode.

At 504, the controller 30 determines an initial lubricant temperature (T_InitLubri) based on the engine off time (EOT) and the approximated lubricant temperature at engine shut off (T_ESO). At 506, the controller 30 starts or initiates a pre-engagement counter (PreEngCnt by setting the pre-engagement counter to one (i.e.,PreEngCnt=i=1). At 508, the controller 30 determines the pre-engagement temperature change (ΔT_PreEng) which is a change of the initial lubricant temperature (T_InitLubri) when no torque is applied to the friction clutch 24. In one form, the pre-engagement temperature change (ΔT_PreEng) is determined based on pre-engagement temperature model and one or more operation variables including the initial lubricant temperature (T_InitLubri). The one or more operation variables may also include the ring gear speed, the clutch slip speed, the ambient temperature, and the drive mode. The pre-engagement temperature change (ΔT_PreEng) is provided as a cumulative temperature change (ΔT_Cum) for a subsequent determination of the approximated lubricant temperature. At 510, the controller 30 determines the approximated lubricant temperature (T_AprLubri) based on the ambient temperature (T_Amb) and the pre-engagement temperature change (ΔT_PreEng). Specifically, the controller 30 calculates the approximated lubricant temperature (T_AprLubri) as a summation of the ambient temperature (T_Amb) and the pre-engagement temperature change (ΔT_PreEng).

Also, at 510, the controller 30 stores the current value of the approximated lubricant temperature (T_AprLubri) in the designated non-volatile memory. Accordingly, when the engine is turned OFF and the controller 30 is turned OFF, the value of the approximated lubricant temperature (T_AprLubri) is stored and can be employed as the last approximated lubricant temperature at the time the engine was turned off or shut off (T_ESO) when the engine is subsequently turned ON (i.e., new ignition cycle).

At 512, the controller 30 determines if a torque command is received. If no torque command is received, the controller 30 proceeds to 514 to increment the pre-engagement counter (PreEngCnt) and obtain current values of the operational variables. Since the friction clutch 24 is not being engaged, the controller 30 proceeds to 516 to determine the pre-engagement temperature change (ΔT_PreEng), as the approximated temperature change, based on one or more operation variables, which includes the cumulative temperature change (ΔT_Cum) from the previous determination of the approximated lubricant temperature (T_AprLubri). The controller 30 then returns to 510 to determine the approximated lubricant temperature (T_AprLubri).

If a torque command is received, the controller 30 proceeds to 520 to obtain current values of the operation variables. At 522 the controller 30 determines a current power state (Pwr) based on the torque (Trq) to be applied to the friction clutch 24 and the clutch slip speed (S_CS).

At 524, the controller 30 determines if the current power state (Pwr) is greater than zero. If the current power state (Pwr) is greater than zero, the friction clutch 24 is to be engaged (i.e., the current power state indicates an engagement state of the friction clutch 24) and the controller 30 proceeds to 526 to clear a disengagement counter (DE_Cnt) and increment an engagement counter (E_Cnt). The disengagement counter (DE_Cnt) is associated with tracking duration of a zero power state or in other words, a disengagement state of the friction clutch 24. The engagement counter (E_Cnt) is associated with tracking duration of power state or an engagement state of the friction clutch 24. Using the counters, the controller 30 can track how long the friction clutch 24 is requested to be engaged or disengaged, which affects the lubricant temperature. The disengagement counter (DE_Cnt) and the engagement counter (E_Cnt) may also be referred to as a power decrease counter and a power increase counter, respectively.

At 528, the controller 30 determines values of the thermal coefficients for the engagement state or power increase state based on the multi-variable correlation data 316 for engagement of the friction clutch 24 (i.e., a first set of multi-variable correlation data) and operation variables (i.e., specifically, a first group of operation variables). For example, the first group of operation variables may include the current power state (Pwr), the ring gear speed, the ambient temperature (T_Amb), and the cumulative temperature change (ΔT_Cum) from the previous determination. At 530, the controller 30 determines an engagement temperature change (i.e., ΔT_Eng) based on the thermal coefficients, the value of the engagement counter (E_Cnt), and the lubricant temperature model 318, and more particularly, the thermal engagement model of the lubricant temperature model 318.

If the controller 30 determines that the power is not greater than zero (i.e., power is zero and the current power state indicates a disengagement state of the friction clutch 24), the controller 30 proceeds to 532 to clear the engagement counter (E_Cnt) and increment the disengagement counter (DE_Cnt). At 534, the controller 30 determines values of the thermal coefficients including cooling-rate thermal coefficients and friction thermal coefficients for disengagement based on the multi-variable correlation data 316, value of the disengagement counter (DE_Cnt), and one or more operation variables (i.e., a second group of operation variables). For example, the second group of operation variables may include the desired power state change, the ring gear speed, the ambient temperature, the drive mode, and the cumulative temperature change from the previous determination. At 536, the controller 30 determines a disengagement temperature change (i.e., ΔT_DisEng) based on the values of the thermal coefficients and the lubricant temperature model 318 and specifically, a thermal disengagement model of the lubricant temperature model 318.

More particularly, for the disengagement state and as described above, the thermal disengagement model includes a lubricant cooling-rate portion and a friction-based thermal portion. The lubricant cooling-rate portion determines a first disengagement temperature change associated with convective thermal characteristics of disengagement, and the friction-based thermal portion determines a second disengagement temperature change associated with friction-based thermal characteristics. The first disengagement temperature change is determined using a first set of thermal coefficients (i.e., also referred to as cooling-rate thermal coefficients) that are determined using a set of multi-variable correlation data related to convective thermal characteristics of disengagement of the friction clutch 24 and the second group of operation variables. The second disengagement temperature change is determined using a second set of thermal coefficients (i.e., also referred to as friction thermal coefficients) that are determined using a set of multi-variable correlation data associated with friction-based thermal characteristics of disengagement of the friction clutch 24 and one or more operation variables from among the second group of operation variables, such as the ring gear speed and the ambient temperature. Accordingly, at 536, the controller 30 is configured to determine the disengagement temperature change (i.e., ΔT_DisEng) of the disengagement state based on a summation of the first disengagement temperature change and the second disengagement temperature change.

From 530 or 536, the controller 30 determines a cumulative temperature change (ΔT_Cum) (i.e., an approximated temperature change), which approximates a change in the approximated lubricant temperature (T_AprLubri) from its previous value. The cumulative temperature change (ΔT_Cum) is employed for a subsequent determination of the approximated lubricant temperature (T_AprLubri). In one form, the cumulative temperature change (ΔT_Cum) is a summation of the engagement temperature change (ΔT_Eng) and the disengagement temperature change (ΔT_DisEng). Accordingly, if the controller 30 determines that the friction clutch 24 is to be engaged (i.e., Pwr is greater than zero), the disengagement temperature change (ΔT_DisEng) would be zero. Thus, the cumulative temperature change (ΔT_Cum) is equal to one of the engagement temperature change (ΔT_Eng) or the disengagement temperature change (ΔT_DisEng). At 540, the controller 30 determines the approximated lubricant temperature (T_AprLubri) based on the ambient temperature and the cumulative temperature change (ΔT_Cum). Specifically, the approximated lubricant temperature (T_AprLubri) is provided as a summation of the ambient temperature and the cumulative temperature change.

At 540, the controller 30 further stores the current value of the approximated lubricant temperature (T_AprLubri) in the designated non-volatile memory. In one form, the controller 30 proceeds to 542 to determine if the engine is turned off and if the engine is turned off, the routine 500 ends. Accordingly, when the engine is turned OFF, the controller 30 is turned OFF and the value of the approximated lubricant temperature (T_AprLubri) stored by the controller 30 at 422 may be employed as the last approximated lubricant temperature at the time the engine was turned off (T_ESO) when the engine is subsequently turned ON (i.e., new ignition cycle). In the event the engine is not turned OFF, the controller 30 returns to 520 to obtain values of the operation variables and determines the approximated lubricant temperature (T_AprLubri).

Figure 5:
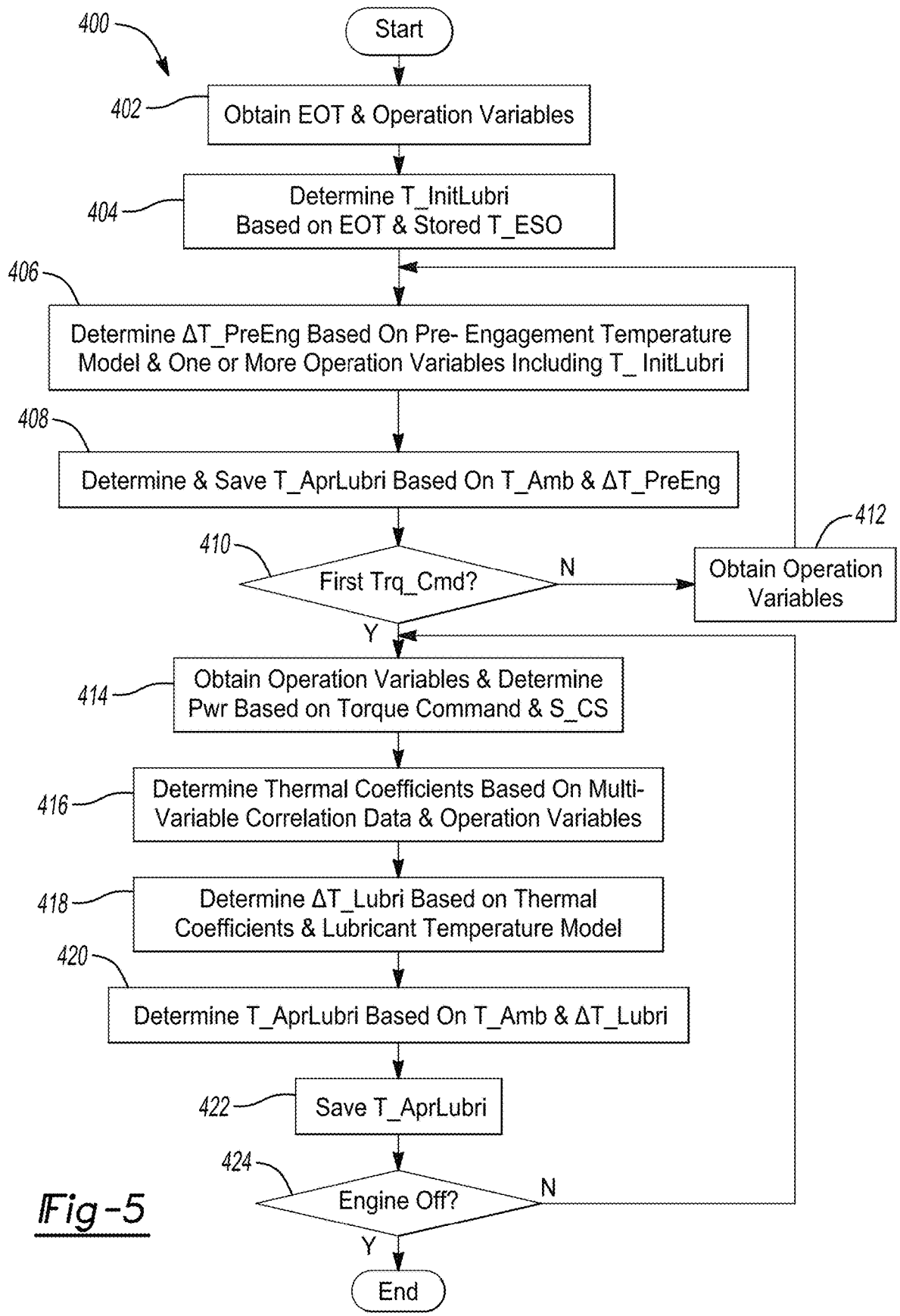
FIG. 5 is a flowchart of an example lubricant temperature determination routine in accordance with the teachings of the present disclosure.

It should be readily understood that the lubricant temperature determination routines 400 and 500 can be configured in other suitable ways and should not be limited to the routines of FIGS. 5 and 6A-6B. For example, the controller 30 may just automatically turn OFF when the engine is turned OFF, and thus, the determination of whether the engine is off is not necessary and the controller 30 is configured to routinely determine the lubricant temperature until the engine is turned OFF. In another variable, in lieu of employing pre-engagement temperature model to determine the pre-engagement temperature change, the controller 30 is configured to use a look-up table, as provided above.

Figure 7:
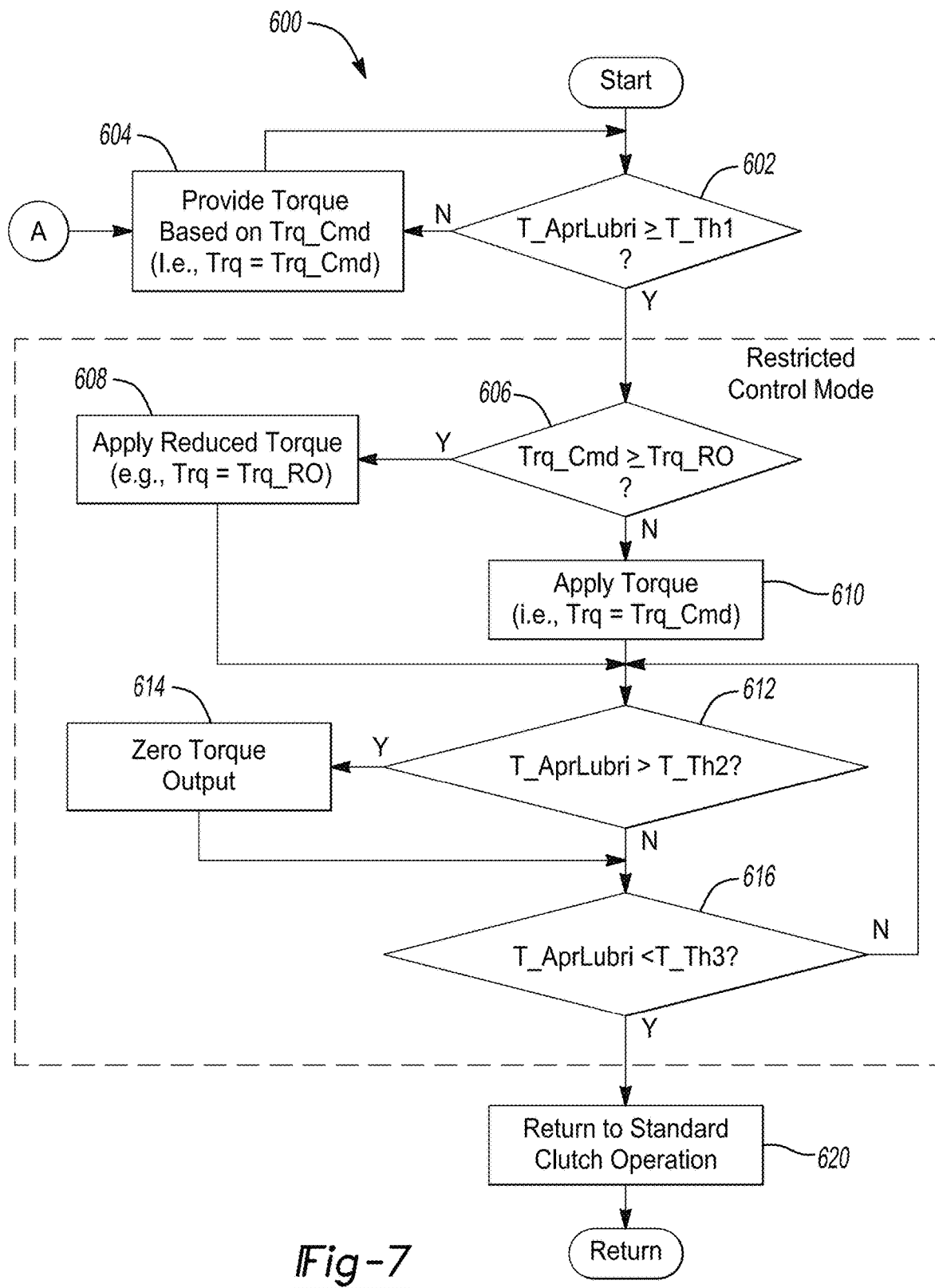
FIG. 7 is a flowchart of an example control routine in accordance with the teachings of the present disclosure.

Referring to FIG. 7, an example torque control routine 600 performed by the controller 30 is provided. In one form, the controller 30 is configured to perform the torque control routine 600 when the controller 30 is ON and after calculating the approximated lubricant temperature (T_AprLubri). At 602, the controller 30 determines if the current value of the approximated lubricant temperature (T_AprLubri) is greater than or equal to a first temperature threshold (T_Th1). If the current value of the approximated lubricant temperature (T_AprLubri) is less than the first temperature threshold (T_Th1), the controller 30 proceeds to 604 to control the actuator 28 to provide torque (Trq) to the friction clutch 24 based on the torque of the torque command (Trq_Cmd). That is, the torque (Trq) applied to the friction clutch 24 is unrestricted or in other words a normal torque output based on the torque command. In addition, the drive mode is unchanged, and thus, if the vehicle is in 4WD, it remains in 4WD.

If the current value of the approximated lubricant temperature (T_AprLubri) is greater than or equal to the first temperature threshold (T_Th1), the controller 30 controls the torque to be applied based on a restricted control mode. Specifically, the controller 30 proceeds to 606 to provide a restricted torque control by determining if the torque of the torque command (Trq_Cmd) is greater than a restricted torque output (Trq_RO). If the controller 30 determines that the torque of the torque command (Trq_Cmd) is greater than the restricted torque output (Trq_RO), the controller 30 proceeds to 608 to control the actuator to provide a reduced torque to the friction clutch 24. For example, the torque (Trq) applied is reduced to the restricted torque output (i.e., the Trq=Trq_RO), where the restricted torque output is less than the maximum permitted torque of the friction clutch 24 (Trq_Max) (e.g., Trq_RO<50%*Trq_Max). If the controller 30 determines that the torque of the torque command (Trq_Cmd) is less than the restricted torque output (i.e., Trq_RO), the controller 30 proceeds to 610 to control the actuator 28 to apply the torque of the torque command (Trq_Cmd) to the friction clutch 24 (i.e., Trq=Trq_Cmd).

As described above, the controller 30 recalculates the approximated lubricant temperature until the controller 30 is turned OFF, and once in the restricted control mode, the controller 30 continues to evaluate the approximated lubricant temperature in the restricted control mode until the approximated lubricant temperature decreases to a value that is less than or equal to a third temperature threshold. Specifically, the controller 30 proceeds to 612 to determine if a current value of the approximated lubricant temperature (T_AprLubri) is greater than or equal to a second temperature threshold (T_Th2), which is greater than the first temperature threshold (T_Th1). If the approximated lubricant temperature (T_AprLubri) is greater than or equal to the second temperature threshold (T_Th2), the controller 30 proceed to 614 to inhibit torque output (i.e., Trq=0) by, for example, not operating the actuator 28 to apply the compressive force to the clutch pack 54 of the friction clutch 24.

After the no torque output at 614 of the routine 600 or if the approximated lubricant temperature (T_AprLubri) is less than the second temperature threshold (T_Th2) as determined at 612 of the routine 600, the controller 30 proceeds to 616 to determine if the approximated lubricant temperature (T_AprLubri) is less than or equal to a third temperature threshold (T_Th3), which is less than the first temperature threshold (T_Th1). If the approximated lubricant temperature (T_AprLubri) is not less than or equal to the third temperature threshold (T_Th3), the controller 30 remains in the restricted control mode by returning to 612. If the approximated lubricant temperature (T_AprLubri) is less than or equal to the third temperature threshold (T_Th3), the controller 30 exits the restricted control mode and proceeds to 620 of the routine 600 to return to standard clutch operation in which the actuator 28 is controlled to provide torque based on the torque command (Trq_Cmd).

It should be readily understood that the torque control routine 600 can be configured in other suitable ways and should not be limited to the routine of FIG. 7. For example, in lieu of tiered restriction approach, the controller 30 may transmit the clutch open command once the approximated lubricant temperature reaches a single set temperature threshold.

While the actuator 28 has been illustrated and described as having an output member that is moved along the second rotational axis 36 in response to the application of fluid pressure, it will be appreciated that the actuator could be configured differently.

Figure 8:
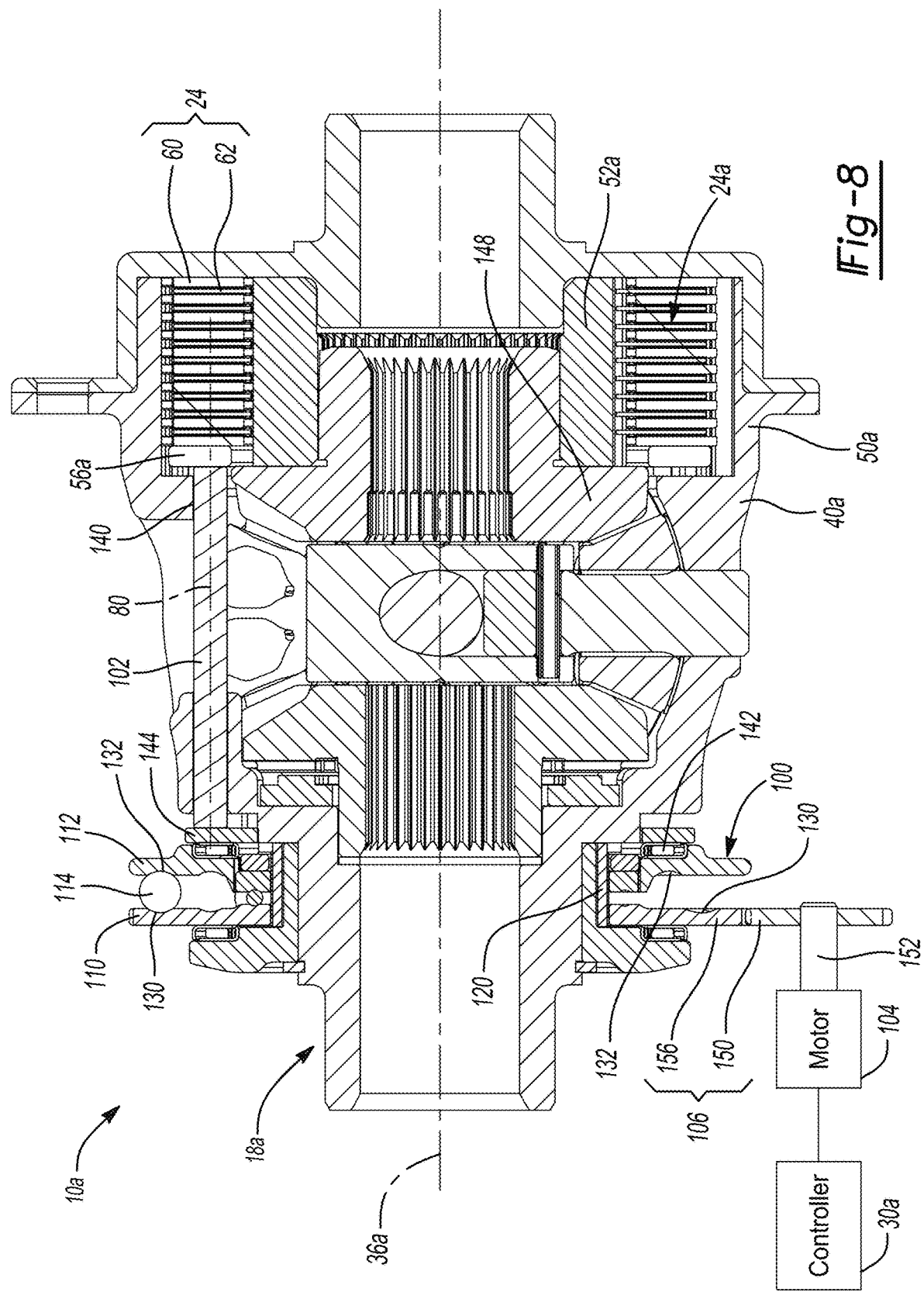
FIG. 8 is a perspective, partly sectioned view of a second power transmission device constructed in accordance with the teachings of the present disclosure.

In FIG. 8, the power transmission device 10*a* includes a differential assembly 18*a*, and the actuator 28*a* includes a ball-ramp mechanism 100, a plurality of pins 102, an electric motor 104 and an actuator gear train 106. The ball-ramp mechanism 100 is conventional in that it includes a first ball-ramp ring 110, a second ball-ramp ring 112 and a plurality of balls 114. The first ball-ramp ring 110 is disposed on a bushing 120 that is mounted on the differential input member 40*a* (i.e., a differential case in the example shown) of the differential assembly 18*a*. The bushing 120 permits the first ball-ramp ring 110 to rotate relative to the differential case 40*a* about a rotational axis 36*a* of the differential case 40*a*. The second ball-ramp ring 112 is non-rotatably but axially slidably disposed on the bushing 120 and as such is rotatable about and axially movable along the rotational axis 36*a* relative to the differential case 40*a*. Each of the balls 114 is received into a pair of ball tracks 130 and 132 that are formed in the first and second ball-ramp rings 110 and 112, respectively. Each of the ball tracks 130 and 132 taper in their depth in a circumferential direction. Each of the pins 102 is received in an associated pin bore 140 that is formed longitudinally through the differential case 40*a*. The pin bores 140 (and thereby the pins 102) are spaced circumferentially about the rotational axis 36*a* of the differential case 40*a*. A thrust bearing 142 and a thrust washer 144 are disposed between the second ball-ramp ring 112 and a first axial end of the pins 102, while the second, opposite axial end of the pins 102 abuts the apply plate 56*a* of the friction clutch 24*a*. In this example, the first clutch member 50*a* is unitarily and integrally formed with the differential case 40*a*, while the second clutch member 52*a* is non-rotatably coupled to a side gear 148 (i.e., a differential output member). The actuator gear train 106 includes an input gear 150, which is coupled to a motor output shaft 152 of the electric motor 104 for rotation therewith, and an output gear 156 that is coupled to the first ball-ramp ring 110 for common rotation about the rotational axis 36*a* of the differential assembly 18*a*. In the example provided, the input gear 150 meshingly engages the output gear 156, but it will be appreciated that the actuator gear train 106 could employ one or more additional gears between the input gear 150 and the output gear 156. The electric motor 104 is selectively operable to rotate the first ball-ramp ring 110 to cause corresponding rotational movement of the balls 114 in the ball tracks 130 and 132 between deep ends and shallow ends of the ball tracks 130 and 132. Positioning of the balls 114 in the deep ends of the ball tracks 130 and 132, the second ball-ramp ring 112 is spaced from the first ball-ramp ring 110 along the rotational axis 36*a* by a first distance, while position of the balls 114 in the shallow ends of the ball tracks 130 and 132 spaces the second ball-ramp ring 112 from the first ball-ramp ring 110 along the rotational axis 36*a* by a second distance that is greater than the first distance. Accordingly, the electric motor 104 can be operated to rotate the first ball-ramp ring 110 and selectively position the pins 102 (i.e., the output members of the actuator 28a in the example provided) along the rotational axis 36a between a first position (corresponding to the placement of the balls 114 in the deep ends of the ball tracks 130 and 132) and a second position (corresponding to the placement of the balls 114 in the shallow ends of the ball tracks 130 and 132) to control the force that is transmitted through the force transmission path 80a to the clutch pack 54a. The controller 30a is configured to determine an approximated lubricant temperature and to control the operation of the actuator 28a based at least on the determined lubricant temperature. In the example provided, the controller 30a operates the electric motor 104 based at least on the approximated lubricant temperature to thereby control the force that is applied by the pins 102 (i.e., the output member of the actuator 28a) to the apply plate 56a. The controller 30a is generally configured in a similar manner as that of controller 30 for determining the approximated lubricant temperature and controlling the actuator 28a, and thus, the description of controller 30a is omitted for purposes of brevity.

Figure 9:
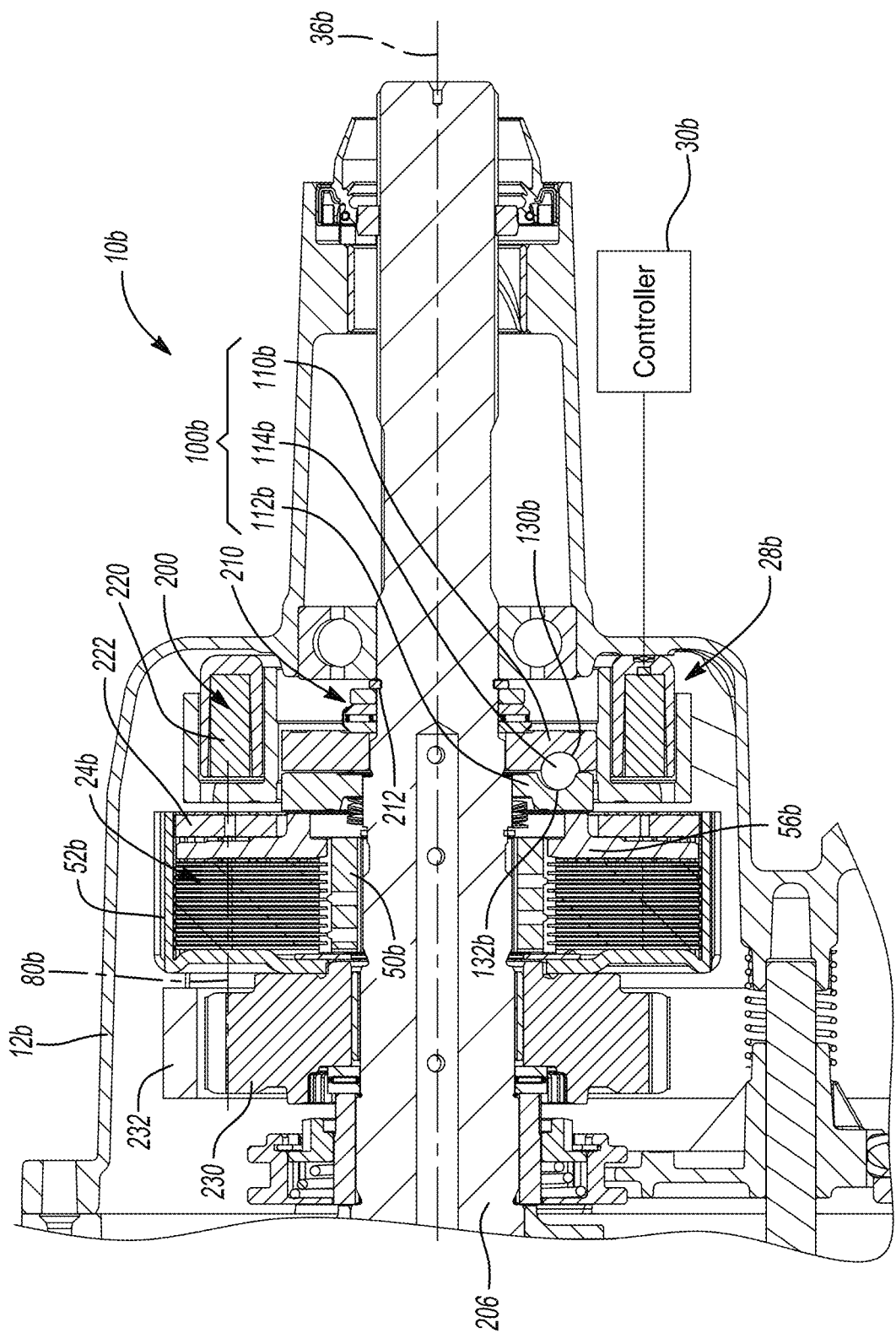
FIG. 9 is a section view of a portion of a third power transmission device constructed in accordance with the teachings of the present disclosure.

In FIG. 9, the power transmission device 10b is a transfer case, and the actuator 28b includes a ball-ramp mechanism 100b and an electromagnet 200. The ball-ramp mechanism 100b is conventional in that it includes a first ball-ramp ring 110b, a second ball-ramp ring 112b and a plurality of balls 114b. The first ball-ramp ring 110b is disposed on a rear output shaft 206 of the transfer case 10b. The first ball-ramp ring 110b is coupled to the rear output shaft 206 for rotation therewith about the rotational axis 36b of the rear output shaft 206. A thrust bearing 210 and a retaining ring 212 limit axial movement of the first ball-ramp ring 110b along the rotational axis 36b in a direction that is opposite the friction clutch 24b. The second ball-ramp ring 112b is mounted on the rear output shaft 206 in a manner that permits both relative rotation about the rotational axis 36b and axial movement along the rotational axis 36b relative to the rear output shaft 206. Each of the balls 114b is received into a pair of ball tracks 130b and 132b that are formed in the first and second ball-ramp rings 110b and 112b, respectively. The ball tracks 130b and 132b taper in their depth in a circumferential direction. The electromagnet 200 includes an electromagnet coil 220 and an armature 222. The electromagnet coil 220 is fixedly coupled to the housing 12b of the transfer case 10b and is selectively operable for generating a magnetic field. The armature 222 is non-rotatably but axially slidably coupled to the second clutch member 52b (i.e., to the output member of the friction clutch 24b). In the example provided, the armature 222 includes a plurality of external teeth (not specifically shown) that matingly engage a plurality of internal teeth (not specifically shown) that are formed on the second clutch member 52b. The first clutch member 50b is rotationally coupled to the rear output shaft 206, while the second clutch member 52b is rotationally coupled to a sprocket 230 that is engaged to a chain 232. The chain 232 is engaged to a second sprocket (not shown) that is rotationally coupled to a front output shaft (not shown). The electromagnet coil 220 can be energized to create a magnetic field that acts on the armature 222 to move the armature 222 along the rotational axis 36b (relative to the second clutch member 52) into engagement with the second ball-ramp ring 112b. Torsional resistance or drag on the second clutch member 52b, which results from components such as the chain 232 and the front output shaft, is transmitted from the armature 222 to the second ball-ramp ring 112b and causes the second ball-ramp ring 112 to rotate about the rotational axis 36b relative to the first ball-ramp ring 110b and cause corresponding rotational movement of the balls 114b in the ball tracks 130b and 132b (i.e., from their deep ends to their shallow ends). Positioning of the balls 114b in the deep ends of the ball tracks 130b and 132b spaces the second ball-ramp ring 112b apart from the first ball-ramp ring 110b along the rotational axis 36b by a first distance (i.e., at a first position), while positioning of the balls 114b in the shallow ends of the ball tracks 130b and 132b spaces the second ball-ramp ring 112b from the first ball-ramp ring 110b along the rotational axis 36b by a second distance (i.e., at a second position). The second distance is greater than the first distance. The second ball-ramp ring 112b, which is the output member of the actuator 28b in the example provided, contacts the apply plate 56b as it moves from the first position to the second position. Accordingly, the electromagnet coil 220 can be operated to control the force that is transmitted through the force transmission path 80b to the clutch pack 54b. The controller 30b is configured to determine an approximated lubricant temperature and to control the operation of the actuator 28b based at least on the determined approximated lubricant temperature. In the example provided, the controller 30b operates the electromagnet coil 220 based at least on the approximated lubricant temperature to thereby control the force that is applied by the second ball-ramp ring 112b (i.e., the output member of the actuator 28b) to the apply plate 56b. The controller 30b is generally configured in a similar manner as that of controller 30 for determining the approximated lubricant temperature and controlling the actuator 28b, and thus, the description of controller 30b is omitted for purposes of brevity.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used herein, the phrases "at least one of A, B, and C" should be construed to mean a logical (A OR B OR C), using a non-exclusive logical OR, and should not be construed to mean "at least one of A, at least one of B, and at least one of C." As used herein, the term "and/or" includes any and all combinations of one or more of the associated listed items.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A power transmission device comprising:
a friction clutch having a clutch pack and an apply plate, the apply plate being movable along an axis, wherein the friction clutch is lubricated with a lubricant;
an actuator with an output member that is movable along the axis between a first position and a second position, wherein the output member, the apply plate and the clutch pack are disposed in a force transmission path, wherein the output member is movable along the axis from the first position to the second position to apply relatively more force through the force transmission path onto the clutch pack; and
a controller configured to:
determine a current power state of the friction clutch,
determine values for a plurality of thermal coefficients based on the current power state, a set of operation variables, and one or more multi-variable correlation data, wherein the plurality of thermal coefficients is indicative of at least two operation variables in the set of operation variables,
determine an approximated temperature change of the lubricant based on the values of the plurality of thermal coefficients and a lubricant temperature model,
determine an approximated lubricant temperature based on the approximated temperature change and a device ambient temperature, and
control operation of the actuator based at least on the approximated lubricant temperature.

2. The power transmission device of claim 1, wherein the lubricant temperature model is based on regression modeling methodology.

3. The power transmission device of claim 1, wherein the set of operation variables includes a differential input speed, a drive mode, and the device ambient temperature.

4. The power transmission device of claim 1, wherein the controller is configured to determine an initial lubricant temperature at an ignition cycle based on a previous ignition approximated lubricant temperature, an engine off time, and the device ambient temperature, wherein the approximated lubricant temperature is further based on the initial lubricant temperature.

5. The power transmission device of claim 4, wherein the controller is configured to determine the initial lubricant temperature employing a temperature initialization model, wherein the temperature initialization model is based on a regression modeling methodology.

6. The power transmission device of claim 4, wherein the controller is configured to determine a pre-engagement lubricant temperature change from the initial lubricant temperature in response to the current power state being zero, wherein the pre-engagement lubricant temperature change is determined based on a pre-engagement temperature model and a second set of operation variables having at least one operation variable different from that of the set of operation variable.

7. The power transmission device of claim 6, wherein the second set of operation variables includes a differential input speed, a clutch slip speed, a drive mode, and the device ambient temperature.

8. The power transmission device of claim 1, wherein the controller is configured to:
determine the approximated temperature change based on a thermal engagement model, as the lubricant temperature model, and a first group of operation variables in response to the current power state indicating an engagement state, wherein the set of operation variables includes the first group of operation variables, and
determine the approximated temperature change based a thermal disengagement model, as the lubricant temperature model, and a second group of operation variables in response to the current power state indicating a disengagement state, wherein the set of operation variables includes the second group of operation variables, wherein the first group of operation variables includes at least one operation variable that is different from that of the second group of operation variables.

9. The power transmission device of claim 8, wherein:
the thermal disengagement model includes:
a lubricant cooling-rate portion to determine a first disengagement temperature change associated with convective thermal characteristics of disengagement, and
a friction-based thermal portion to determine a second disengagement temperature change associated with friction-based thermal characteristics, and
the controller is configured to determine the approximated temperature change of the disengagement state based on a summation of the first disengagement temperature change and the second disengagement temperature change.

10. The power transmission device of claim 9, wherein the second disengagement temperature change is determined based on a differential input speed and the device ambient temperature, wherein the set of operation variables includes the differential input speed and the device ambient temperature.

11. The power transmission device of claim 8, wherein:
the first group of operation variables includes the current power state, a differential input speed, the device ambient temperature, and the approximated temperature change in a previous determination, and
the second group of operation variables includes a desired power state change, the differential input speed, the device ambient temperature, and the approximated temperature change in the previous determination, wherein the desired power state change is determined based on the current power state and a previous power state.

12. The power transmission device of claim 1, wherein the controller is configured to store the approximated temperature change, as a previous approximated temperature change, and determine a subsequent approximated temperature change based on the previous approximated temperature change.

13. The power transmission device of claim 1, wherein the controller is configured to:
determine whether the approximated lubricant temperature is greater than a first temperature threshold, and
control the actuator to provide a reduced torque output in response to the approximated lubricant temperature being greater than the first temperature threshold, wherein the reduced torque output is less than or equal to a defined torque limit that is less than a maximum torque output of the actuator.

14. The power transmission device of claim 13, wherein the controller is configured to:
determine whether the approximated lubricant temperature is greater than a second temperature threshold, wherein the second temperature threshold is greater than the first temperature threshold; and
provide a zero torque output in response to the approximated lubricant temperature being greater than the second temperature threshold.

15. The power transmission device of claim 14, wherein the controller is configured to:
determine whether the approximated lubricant temperature is less than or equal to a third temperature threshold, wherein the third temperature threshold is less than the first temperature threshold, and
control the actuator based on a standard clutch operation in response to the approximated lubricant temperature being less than or equal to the third temperature threshold.

16. The power transmission device of claim 1, wherein the controller is configured to determine a target input torque based on the approximated lubricant temperature, predefined correlation data, and a torque command.

17. A power transmission device comprising:
a friction clutch having a clutch pack and an apply plate, the apply plate being movable along an axis, wherein the friction clutch is lubricated with a lubricant;
an actuator with an output member that is movable along the axis between a first position and a second position, wherein the output member, the apply plate and the clutch pack are disposed in a force transmission path, wherein the output member is movable along the axis from the first position to the second position to apply relatively more force through the force transmission path onto the clutch pack; and
a controller configured to:
determine a current power state of the friction clutch,
determine whether the current power state indicates one of an engagement state or a disengagement state of the friction clutch,
in response to determining the current power state indicating the engagement state, the controller is configured to:
determine values for a first set of thermal coefficients based on a first group of operation variables and a first set of multi-variable correlation data, wherein the first group of operation variables includes the current power state, a differential input speed, a device ambient temperature, and a previous approximated temperature change, and
determine a current approximated temperature change of the lubricant based on a thermal engagement model and the values of the first set of thermal coefficients,
in response to determining the current power state is the disengagement state the controller is configured to:
determine values for a second set of thermal coefficients based on the current power state, a second group of operation variables, and a second set of multi-variable correlation data, wherein the second group of operation variables includes a desired power state change, the differential input speed, the device ambient temperature, and the approximated temperature change in a previous determination, wherein the desired power state change is determined based on the current power state and a previous power state, and
determine the current approximated temperature change of the lubricant based on a thermal disengagement model and the values of the second set of thermal coefficients,
determine an approximated lubricant temperature based on the current approximated temperature change and the device ambient temperature, and
control operation of the actuator based at least on the approximated lubricant temperature.

18. The power transmission device of claim 17, wherein:
the thermal disengagement model includes:
a lubricant cooling-rate portion to determine a first disengagement temperature change associated with convective thermal characteristics of disengagement, and
a friction-based thermal portion to determine a second disengagement temperature change associated with friction-based thermal characteristics, the controller is configured to determine the approximated temperature change of the disengagement state based on a summation of the first disengagement temperature change and the second disengagement temperature change.

19. The power transmission device of claim 17, wherein the set of operation variables includes a differential input speed, a drive mode, and the device ambient temperature.

20. The power transmission device of claim 17, wherein the controller is configured to:
- determine whether the approximated lubricant temperature is greater than a first temperature threshold,
- determine whether the approximated lubricant temperature is greater than a second temperature threshold, wherein the second temperature threshold is greater than the first temperature threshold,
- control the actuator to provide a reduced torque output, wherein the reduced torque output is less than a first defined torque limit that is less than a maximum torque output of the actuator in response to the approximated lubricant temperature being greater than the first temperature threshold and less than the second temperature threshold,
- provide a zero-torque output in response to the approximated lubricant temperature being greater than the second temperature,
- determine whether the subsequent approximated lubricant temperature is less than or equal to a third temperature threshold, wherein the third temperature threshold is less than the first temperature threshold, and
- control a actuator based on a standard clutch operation in response to the approximated lubricant temperature being less than or equal to the third temperature threshold.

* * * * *